United States Patent
Janardhanan

(10) Patent No.: US 9,692,686 B2
(45) Date of Patent: Jun. 27, 2017

(54) METHOD AND SYSTEM FOR IMPLEMENTING A MULTI-CHASSIS LINK AGGREGATION GROUP IN A NETWORK

(75) Inventor: Pathangi Narasimhan Janardhanan, Chennai (IN)

(73) Assignee: DELL PRODUCTS L.P., Round Rock, TX (US)

( * ) Notice: Subject to any disclaimer, the term of this patent is extended or adjusted under 35 U.S.C. 154(b) by 1182 days.

(21) Appl. No.: 13/491,445

(22) Filed: Jun. 7, 2012

(65) Prior Publication Data
US 2012/0314715 A1 Dec. 13, 2012

Related U.S. Application Data

(60) Provisional application No. 61/494,445, filed on Jun. 8, 2011.

(51) Int. Cl.
| | |
|---|---|
| *H04L 12/54* | (2013.01) |
| *H04L 12/709* | (2013.01) |
| *H04L 12/713* | (2013.01) |
| *H04L 12/931* | (2013.01) |
| *H04L 12/753* | (2013.01) |

(52) U.S. Cl.
CPC ......... *H04L 45/245* (2013.01); *H04L 45/586* (2013.01); *H04L 49/70* (2013.01); *H04L 45/48* (2013.01); *Y02B 60/33* (2013.01)

(58) Field of Classification Search
None
See application file for complete search history.

(56) References Cited

U.S. PATENT DOCUMENTS

| | | | |
|---|---|---|---|
| 5,913,207 A | 6/1999 | Chaudhuri et al. | |
| 7,730,216 B1 | 6/2010 | Issa et al. | |
| 7,835,376 B2 * | 11/2010 | Tanaka | 370/401 |
| 7,912,091 B1 | 3/2011 | Krishnan et al. | |
| 8,085,791 B1 | 12/2011 | Aggarwal et al. | |
| 8,885,641 B2 * | 11/2014 | Raman et al. | 370/389 |
| 2003/0061533 A1 * | 3/2003 | Perloff | H04L 1/22 714/4.3 |
| 2008/0181196 A1 | 7/2008 | Regan et al. | |
| 2009/0010254 A1 | 1/2009 | Shimada | |
| 2009/0307334 A1 | 12/2009 | Maltz et al. | |
| 2010/0027420 A1 | 2/2010 | Smith | |
| 2010/0189117 A1 | 7/2010 | Gowda et al. | |

(Continued)

OTHER PUBLICATIONS

Perlman, R. et al., RBridges: Base Protocol Specification, TRILL Working Group, 3 Mar 2010, pp. 1-116.*

(Continued)

*Primary Examiner* — Benjamin Lamont
(74) *Attorney, Agent, or Firm* — Haynes & Boone, LLP

(57) ABSTRACT

An information handling system is provided. The information handling system includes systems and methods for implementing a multi-chassis link aggregation group (MLAG) in a network. This may be achieved by connecting at least two switches to a plurality of servers, with at least one logical bridging device and at least one MLAG configured in between the network and the plurality of servers. The at least one logical bridging device may be associated with the at least one MLAG. The system may include at least one MLAG per logical bridging device, but may include more MLAGs than logical bridging devices.

9 Claims, 7 Drawing Sheets

(56) References Cited

U.S. PATENT DOCUMENTS

| | | | |
|---|---|---|---|
| 2010/0246388 A1* | 9/2010 | Gupta et al. | 370/225 |
| 2011/0243136 A1 | 10/2011 | Raman et al. | |
| 2011/0299536 A1* | 12/2011 | Cheng et al. | 370/392 |
| 2012/0033541 A1* | 2/2012 | Jacob Da Silva et al. | 370/217 |
| 2012/0033546 A1* | 2/2012 | Joshi | H04L 43/0811 370/225 |
| 2012/0033668 A1* | 2/2012 | Humphries | 370/390 |
| 2012/0033672 A1* | 2/2012 | Page et al. | 370/395.53 |
| 2012/0163164 A1 | 6/2012 | Terry et al. | |
| 2013/0308649 A1* | 11/2013 | Cheng et al. | 370/397 |

OTHER PUBLICATIONS

PCT International Search Report and Written Opinion mailed Sep. 14, 2012, in related International Application No. PCT/US2012/041672.

PCT International Preliminary Report on Patentability and Written Opinion mailed Apr. 3, 2014, in related International Application No. PCT/US2012/041672.

PCT International Search Report and Written Opinion mailed Nov. 7, 2013, in related International Application No. PCT/US2012/035118, filed Apr. 26, 2012.

* cited by examiner

Table 600A

| MAC Addresses 604A | RBridge Identifier 606A |
|---|---|
| MAC #1 | Logical RBridge ID #1 |
| MAC #2 | Logical RBridge ID #2 |
| MAC #3 | Logical RBridge ID #3 |
| MAC #4 | Physical RBridge ID #1 |
| MAC #5 | Physical RBridge ID #2 |
| MAC #6 | Physical RBridge ID #3 |

FIG. 6A

Table 600B

| Ingress Port Identifier 604B | RBridge Identifier 606B |
|---|---|
| Ingress Port ID #1 | Logical RBridge ID #1 |
| Ingress Port ID #2 | Logical RBridge ID #2 |
| Ingress Port ID #3 | Logical RBridge ID #3 |
| Ingress Port ID #4 | Physical RBridge ID #1 |
| Ingress Port ID #5 | Physical RBridge ID #2 |
| Ingress Port ID #6 | Physical RBridge ID #3 |

METHOD AND SYSTEM FOR IMPLEMENTING A MULTI-CHASSIS LINK AGGREGATION GROUP IN A NETWORK

This application claims priority to U.S. Provision Application No. 61/494,445, filed Jun. 8, 2011, the contents of which are hereby incorporated by reference in their entirety.

BACKGROUND

1. Technical Field

The present disclosure relates generally to networks and information handling systems and specifically to implementing an MLAG interface in a TRILL network.

2. Discussion of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Certain information handling systems, such those in a data center may include racked servers coupled to top-of-rack switches connecting the racked servers to a core network. In some circumstances traffic to and from a set of racked servers may experience problems. For example, if the top-of-rack switch fails, the servers may no longer be accessible to the core network. While it may be advantageous to include a redundant top-of-rack switch, even these arrangements have not proven entirely satisfactory. What is needed is a better method for improving dual top-of-rack switch configurations.

SUMMARY

Consistent with some embodiments, there is provided an information handling system. The information handling system, the system may include a first switch and a second switch. The second switch may be in communication with the first switch, and the first and second switches may be configured to communicate with a plurality of core physical bridging devices and with a set of servers. The information handling system may also include a logical bridging device with the first and second switches advertising connectivity to the logical bridging device.

Consistent with some embodiments, there is further provided an information handling system that may include a plurality of bridging devices and a first switch coupled to a second switch. The first and second switches may be coupled to the plurality of physical bridging devices and may advertise, to the plurality of physical bridging devices, a connection to a logical bridging device. The first and second switches may each include a physical bridging device. The information handling system may further include a set of servers coupled to the first and second switches through a plurality of ports.

Other embodiments may provide a method of implementing a multi-chassis link aggregation group (MLAG) in a network. The method may include receiving a packet at one of a plurality of switches from one of a plurality of servers. Each of the plurality of switches may include a physical bridging device and may advertise connectivity to a logical bridging device. The method may further include determining whether the packet was received at a port associated with the MLAG and encapsulating the packet using an identifier of the logical bridging device in the header if the packet was received at a port associated with the MLAG. The method may include encapsulating the packet using an identifier that is not the identifier of the logical bridging device if the packet was not received at a port associated with the MLAG. The method may terminate by forwarding the encapsulated packet toward its destination through a plurality of bridging devices connected to the one of the plurality of servers through the plurality of switches.

These and other embodiments will be described in further detail below with respect to the following figures.

BRIEF DESCRIPTION OF THE DRAWINGS

FIG. 6A illustrates an embodiment of a lookup table that can be included in the TORs of FIG. 4.

FIG. 6B illustrates another embodiment of a lookup table that can be included in the TORs of FIG. 4.

These drawings may be better understood with reference to the following Detailed Description. In the Detailed Description, similar features of multiple embodiments may be consistently named and numbered for clarity. This should not be understood as limiting the disclosure.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
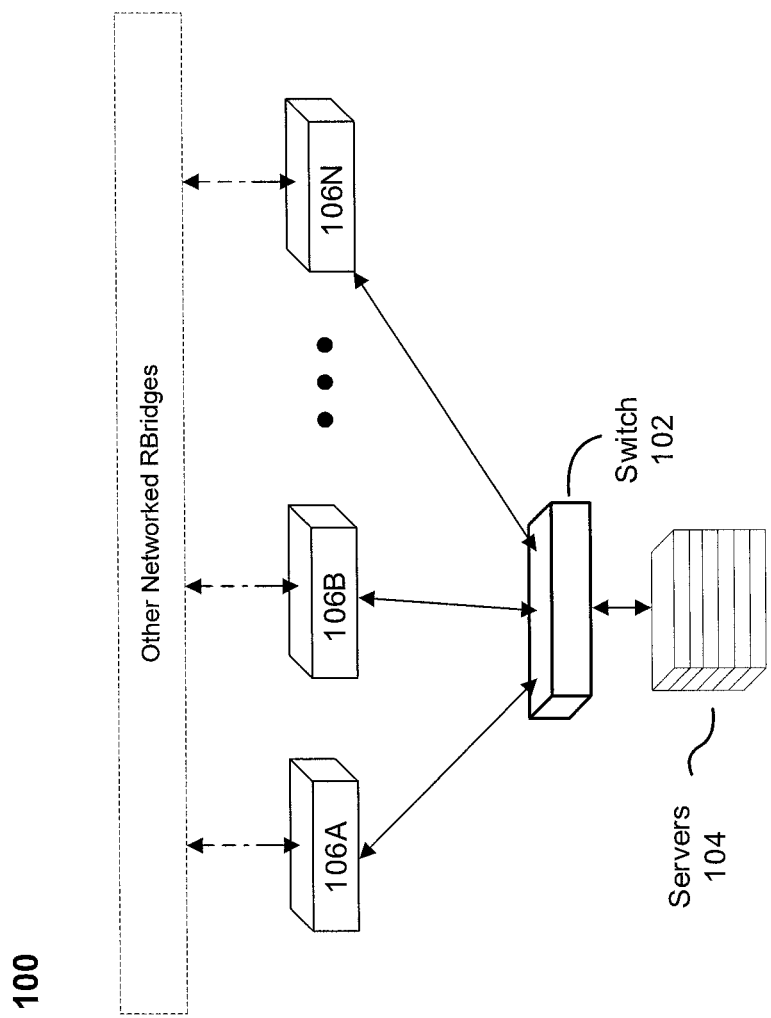
FIG. 1 illustrates the topology of a network 100 with one top-of-rack (TOR) device.

FIG. 1 depicts an information handling system in the form of a network 100. Network 100 may implement a layer-2 network protocol referred to as Transparent Interconnect of Lots of Links (TRILL) that has been developed to better use available bandwidth in a network by identifying multiple, non-looping data paths through that network. The TRILL protocol is a protocol defined by the Internet Engineering Task Force. Information handling system 100 (also called network 100 herein) may include a plurality of routing bridges. Routing bridges ("RBridges") are network devices that implement the TRILL protocol. FIG. 1 illustrates a topology of network 100 that includes a TRILL portion and a non-TRILL portion. The TRILL portion of network 100 may include a plurality of core RBridges 106A-N, three such RBridges are depicted in FIG. 1, and a top-of-rack switch (TOR) 102. In some embodiments, TOR 102 may be a switch other than a top-of-rack switch. TOR 102 may include an RBridge or provide RBridge-functionality and may effectively mediate between the TRILL and non-TRILL portions of network 100. Thus, TOR 102 may be configured to forward traffic from the TRILL portion to one or more of the host devices such as a set of servers 104 and from servers 104 into the TRILL portion and any of the RBridges 106A-N therein. The set of servers 104 may include one or more servers. The non-TRILL portion of network 100 may include the servers 104 or similar host devices that operate to store and process information, run applications, and provide other services.

In operation, any of servers 104 in network 100 may send data to TOR 102. For example, one of servers 104 may send data in the form of an Ethernet frame to TOR 102. TOR 102 may receive the data frame and encapsulate it with a TRILL header before transmitting it to one of RBridges 106A-N. Conversely, TOR 102 may operate to receive TRILL-encapsulated data from any of RBridges 106A-N to which it is connected and may remove the TRILL header from the encapsulated data frame and send the frame to one or the servers.

Given the topology of network 100, in the event that TOR 102 fails, information and applications stored and running on the servers may be not available to users connected to network 100. Depending upon the critical nature of the information stored and the applications running on the host devices, failure of the TOR may impact users of the information and application to a greater or lesser extent.

Figure 2:
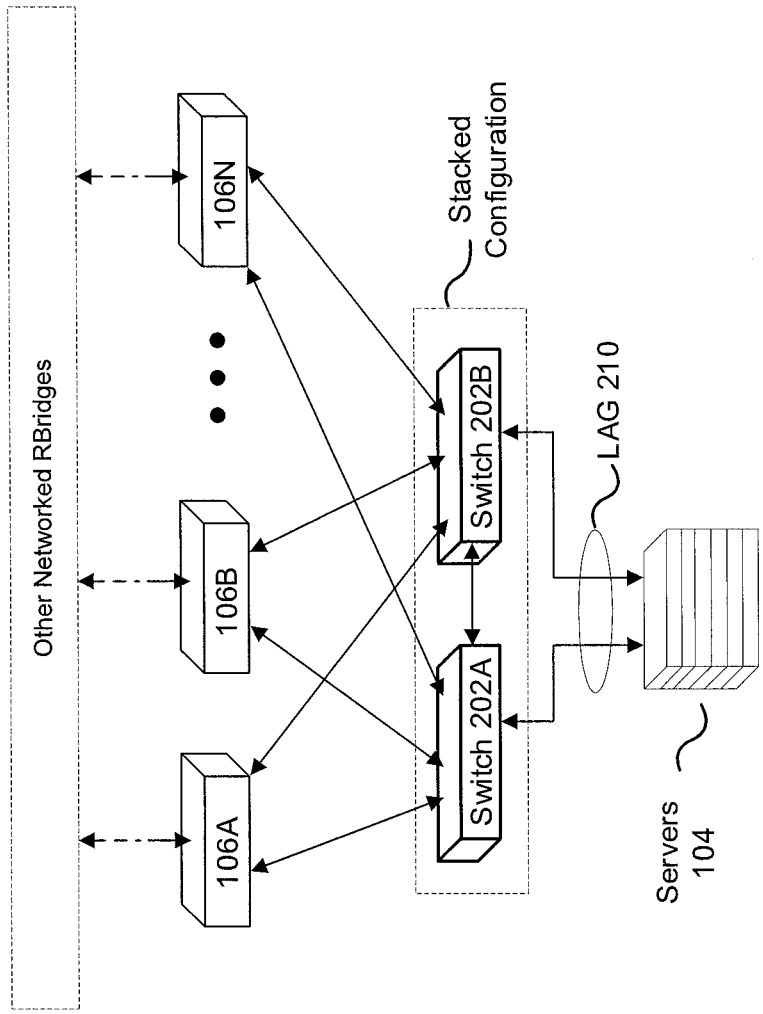
FIG. 2 illustrates the topology of a network 200 with two stacked TOR devices.

FIG. 2 depicts a network 200 which may help mitigate the effects of a failure of the TOR 102 switch as seen in network 100. FIG. 2 includes a stacked pair of top-of-rack switches, TOR 202A and TOR 202B. TORs 202A and 202B may offer redundancy by being configured in a stacked relationship, being connected by a stacking link. The topology of network 200 may be similar in many respects to that of network 100 in FIG. 1, but may further include the redundant, stacked TORs 202A and 202B instead of a single TOR 102. TORs 202A and 202B may appear to the RBridges 106A-N as a single RBridge and as a single top-of-rack switch to servers 104.

To allow this, TORs 202A-B may be in communication with servers 104 by a link aggregation group (LAG) 210. LAG 210 may be configured between the stacked TORs 202A-B and servers 104 as depicted in FIG. 2. LAG 210 may exist between a single server and TORs 202A-B, and therefore a different LAG may exist between each server of servers 104 and the TORs 202A-B. Thus, while LAG 210 is depicted as a single LAG, LAG 210 may represent multiple LAGs, one for each of servers 104. LAG 210 may include at least one link from each server of servers 104 to each of TOR 202A and TOR 202B such that each server is connected to both TORs. Both links from each server to the TORs may operate in active-active mode. LAG 210 may implement the IEEE 802.1AX-2008 link aggregation standard.

In operation, a frame of information sent by one of servers 104 to either of TORs 202A-B may be processed by the receiving TOR and encapsulated in a TRILL header for transmission to any of RBridges 106A-N. The TRILL header is applied outside the inner header and may include a hop count, an ingress RBridge address, an egress RBridge address, and other fields. In the opposite direction, a packet received by one of TORs 202A-B from any of RBridges 106A-N may be decapsulated, thereby removing its TRILL header, before being sent to a destination server in servers 104. In the event that a link comprising LAG 210 fails, the remaining path from TOR 202A or TOR 202B to servers 104 may remain active. Thus network 200 may continue to transmit network data to and from servers 104. However, this configuration is not without its drawbacks.

Figure 3:
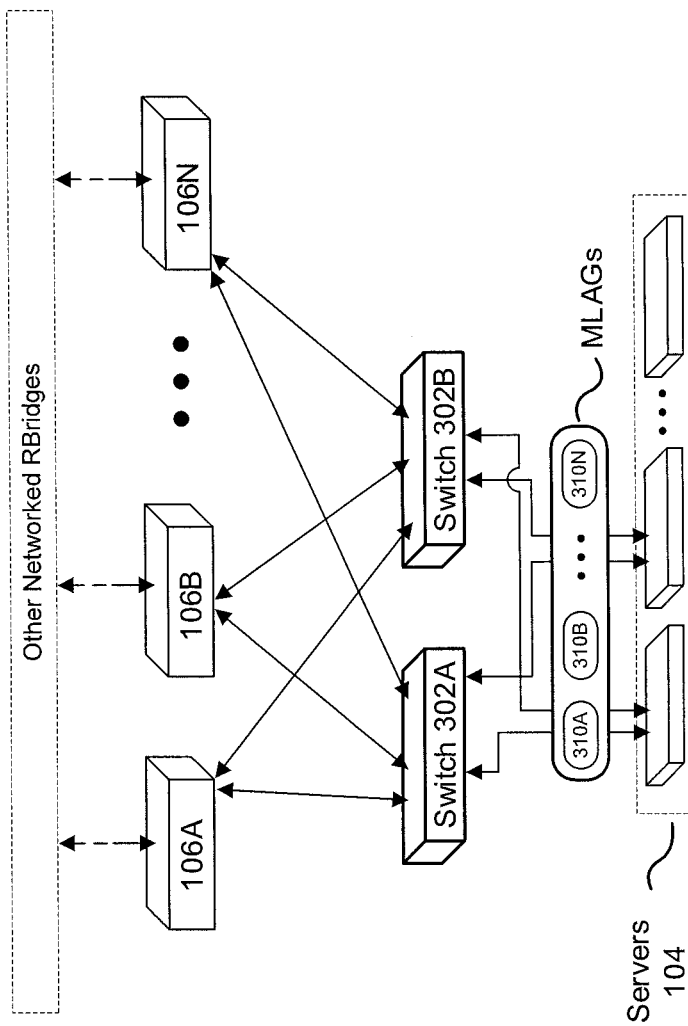
FIG. 3 illustrates the topology of a network 300 with two switch devices configured to support an MLAG.

FIG. 3 depicts a network 300 which may address some of the concerns of network 200 of FIG. 2. Network 300 may include a TOR 302A and a TOR 302B, both TORs configured with a multi-chassis link aggregation group (MLAG) 310A. Network 300 may further include any number of MLAGs, depicted as MLAGs 310A-N. Each of MLAGs 310A-N may be a LAG implementation in which the LAG-terminates on two separate chassis. Each of servers 104 may have one of MLAGs 310A-N associated with it, although connections are depicted in FIG. 3 for only two of servers 104. The MLAG implementation of MLAG 310 may ensure that TORs 302A-B appear to one of servers 104 as a single logical entity for the purpose of the LAG. Servers 104 may use the IEEE 802.1AX-2008 standard in connection with each respective MLAG implementation. Typically, both sets of links associated with the MLAG are active, but in the event that one set fails, only one set is active, in which case all network traffic may be directed to the active set of links associated with the MLAG.

Network 300 may include a plurality of bridge devices depicted by three RBridges, RBridges 106A, 106B, and 106N, connected to two other bridge devices depicted by the two TOR switches, TOR 302A and 302B. For clarity of explanation, the bridge devices 106A-N are generally referred to as RBridges 106A-N, and the bridge devices 302A-B are generally referred to as TORs 302A-B, although embodiments are limited by these labels.

TORs 302A-B may be capable of implementing TRILL protocols and may include RBridge-functionality. TORs 302A-B may be connected to each of the servers in servers 104. In FIG. 3, connections are shown for two of servers 104. TORs 302A-B may be configured with at least one of MLAGs 310A-N is provided for each of servers 104. To simplify explanation, MLAG 310A will be discussed, with the following being analogously applicable to MLAG 310B, etc. MLAG 310A may make it so that, for the ports on which MLAG 310A is configured, the TORs 302A-B may appear to its respective one of servers 104 as a single, logical device, while appearing to the rest of network 300 as two separate switches.

Consistent with some embodiments, separate networking processors running on each of the two TORs operates to build and maintain switching tables for that TOR. Consequently, an advantage of configuring an MLAG on two TORs in this manner is that the operation of one of the two TORs is not affected in the event that a networking processor on the other TOR fails. However, implementing the topology illustrated in FIG. 3 can result in certain network inefficiencies. Due to regular media access control (MAC) address learning in network 300, RBridges 106A-N may come to the determination that the source MAC address has changed and RBridges 106A-N may modify internal lookup tables to accommodate the perceived change in the source MAC address. If one of servers 104 sends multiple packets to both TOR 302A and TOR 302B, RBridges 106A-N may respond to the perceived MAC address moves by continually modifying their MAC tables, which is an inefficient use of RBridge resources.

Figure 4:
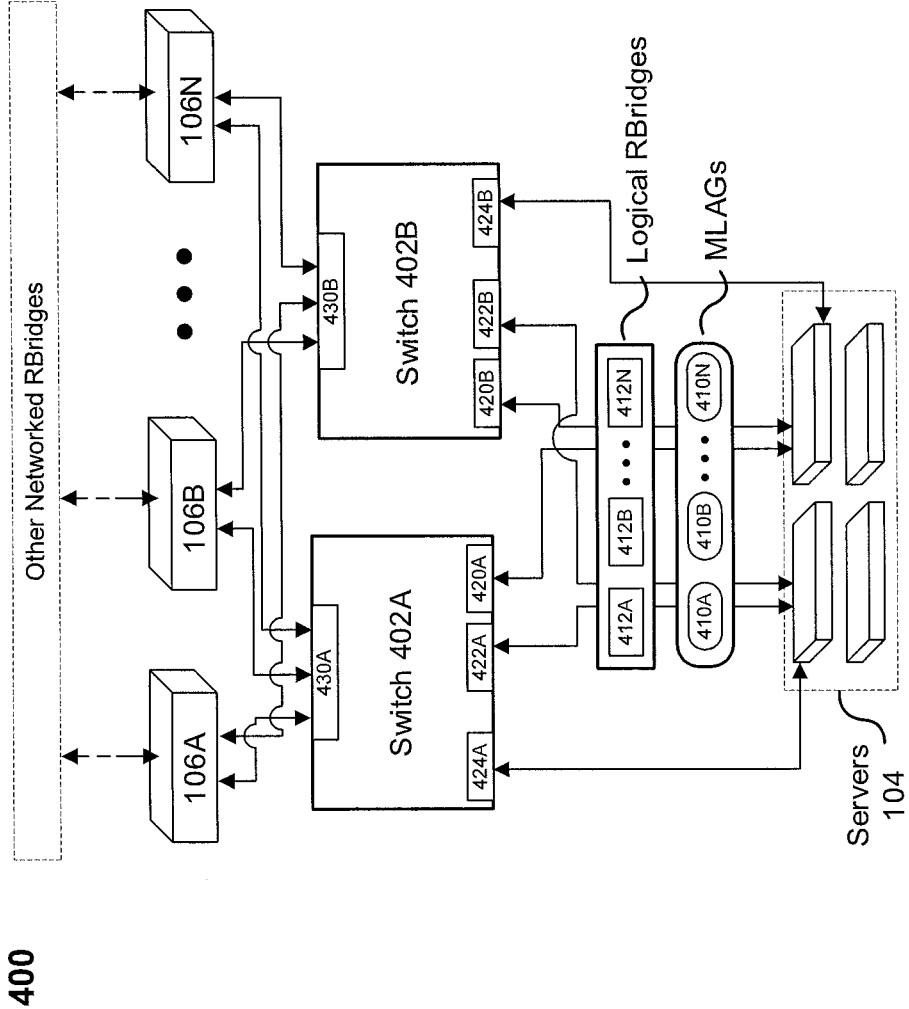
FIG. 4 illustrated the topology of a network 400 with two switch devices configured to support an MLAG through the use of a logical bridge device.

FIG. 4 illustrates an embodiment of a network 400, similar to network 300, but having a topology that includes at least one logical or pseudo bridging device. In some embodiments, the logical or pseudo bridging device may be a logical or pseudo RBridge. To overcome the limitations posed by implementing an MLAG in a network, each of the two switching devices that are configured to support a particular MLAG may be configured to advertise, to all the routing devices in the network to which the two switching devices are connected, connectivity to a logical or pseudo RBridge.

Advertising connectivity to the logical RBridge in this manner may overcome the continuous MAC address move problem, since the other RBridges in the network may see the logical RBridge as connected to the servers, rather than to the two TORs being connected directly to the servers. The two TORs may appear to the core RBridges in the network topology as equidistant RBridges through which a packet must travel to reach the MLAG ports on the servers.

While FIG. 4 and other figures depict the switching devices as being top-of-rack switches and the bridging devices as RBridges, network 400 is not so limited. Additionally, the networks of other figures discussed herein should not be understood as being limited to top-of-rack switches only, but may refer to other kinds of network switch devices. Thus, some embodiments of network may include switching devices that are not top-of-rack switches and may include bridging devices that are not RBridges. However, for clarity of description the switching devices will be discussed as being TORs and the bridging devices discussed as being RBridges. In embodiments in which the switching devices are TORs, the TORs of network 400 may provide RBridge-functionality so as to be better able to mediate between the servers and the core of the network.

As depicted in FIG. 4, network 400 includes two TORs, TOR 402A and TOR 402B. Both TOR 402A and 402B may be configured to act as top-of-rack switches while also providing RBridge-functionality. Each of TORs 402A-B may include a plurality of ports. Some of the plurality of ports on each of TORs 402A-B may be associated with links to other RBridges in network 400, depicted by RBridge 106A-N. Each of the pluralities of ports on TORs 402A and 402B may also include a number of ports that are configured to support an MLAG 410. Two such MLAG ports are depicted on either of TORs 402A-B; this includes ports 420A and 422A on TOR 402A and ports 420B and 422B on TOR 402B. These MLAG ports may be physically connected over links to servers 104, with any connected server in servers 104 having a link to both TOR 402A and TOR 402B. In practice, many more MLAG ports may be present than are depicted.

Each of the pluralities of ports on TORs 402A-B may also include a number of ports that are not aggregated together, that do not support one of MLAGs 410A-N. These non-MLAG ports may also be connected over one or more links to the one or more servers 104. FIG. 4 depicts one such port on each of TORs 402A-B, though TORs 402A-B may contain many more such ports. In FIG. 4, TOR 402A includes a non-MLAG port 424A, and TOR 402B includes a non-MLAG port 424B.

TORs 402A-B may include a lookup table to guide routing determinations and provide information for header formation. A lookup table entry associated with each MLAG port on TOR 402A and TOR 402B may include a MAC address of whichever server of servers 104 to which the particular MLAG port is linked. For example, ports 420A and 420B may be associated in a lookup table with a MAC address of a first server, while ports 422A and 422B may be associated in the lookup table with a MAC address of a second server.

The lookup table entry associated with each MLAG port may include the identity of the logical RBridge of logical RBridges 412A-N assigned to the particular MLAG of MLAGs 410A-N. In contrast, lookup table entries associated with non-MLAG ports may contain an identity of the physical RBridge of the TOR to which the port may be physically linked. Since some embodiments may include a plurality of MLAGs as depicted in FIG. 4, the lookup tables may include a plurality of logical RBridge identifiers. In some embodiments there may be one logical RBridge, and therefore a single logical RBridge identifier, for each MLAG. So an identifier of logical RBridge 412A may be associated with MLAG 410A. In additional embodiments, one logical RBridge may be used to support a plurality of MLAGs, thus a one-to-one correspondence is not required. In such an embodiment, logical RBridge 412B may support MLAGs 410A and 410B.

From the perspective of core RBridges like RBridges 106A-N, MLAG ports on servers 104 may be accessible through a single RBridge, being one of logical RBridges 412A-N. TORs 402A-B effectively provide paths to servers 104. For example, RBridges 106A-N may use either the shortest path through one of TORs 402A-B or equal-cost multipath to both TORs 402A-B to reach the servers through logical RBridge 412B. In embodiments with a plurality of MLAGs, a logical topology of network 400 may include a plurality of logical RBridges in between TORs 402A-B and servers 104.

Continuing to refer to FIG. 4, when one of TORs 402A-B, for example TOR 402A, receives a packet from one of servers 104 on a port that is assigned to MLAG 410, TOR 402A may encapsulate the packet in a TRILL header that includes an identifier of logical RBridge 412B as the ingress RBridge address in the header, rather than an identifier of TOR 402A to which the one of servers 104 is physically connected. Conversely, if one of TORs 402A-B, for example TOR 402B, receives a packet from one of servers 104 on a non-MLAG or regular port, TOR 402B may encapsulate the packet with a TRILL header that includes an identifier of TOR 402B as the ingress RBridge address. These RBridge identifiers may also be referred to as "nicknames."

On the other hand, when one of TORs 402A-B receives a TRILL frame from one of RBridges 106A-N, and the frame's header includes the identifier or nickname of logical RBridge 412A, then that TOR may determine that the frame is to be forwarded over the MLAG 410A to the associated one of servers 104. This determination may be made by performing a lookup in a lookup table. As an example, if TOR 402B receives a frame from RBridge 106A and the frame's header includes the nickname of logical RBridge 412A as an egress RBridge address, TOR 402B may determine that the frame should be forwarded to logical RBridge 412A. TOR 402B may determine that the identifier of logical RBridge 412A is actually an identifier of TOR 402B and that the frame should be decapsulated and sent over the appropriate MLAG port, such as port 422B. Again, this may be determined by performing a lookup in a lookup table.

FIG. 4 depicts a set of logical RBridges so that the connections between the MLAG ports of TORs 402A and 402B may be considered as connected to different logical RBridges and different MLAGs according to different embodiments. However, in the topology of network 400, MLAG ports would be properly viewed as being logically connected to one of the logical RBridges 412A-N rather than to the set.

If TOR 402B receives a TRILL frame that includes the nickname of the RBridge of TOR 402B as the egress RBridge address, it may determine that the nickname is its own nickname. In this instance, the lookup table may indicate that the packet should be transmitted to one of servers 104 over one of TOR 402B's non-MLAG ports, such as port 424B.

Figure 5:
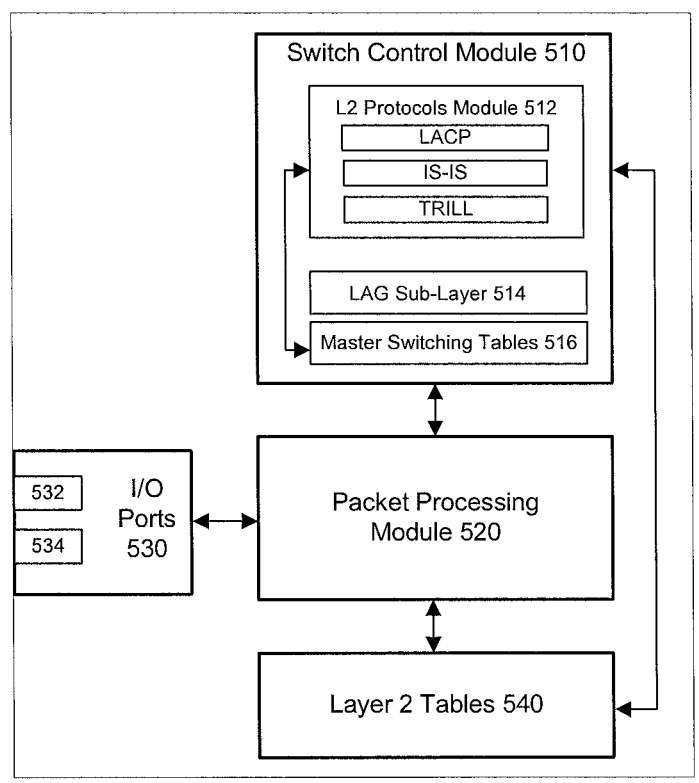
FIG. 5 is a block diagram showing modules and components comprising one of the TORS of FIG. 4.

FIG. 5 illustrates an exemplary switching device or switch 500 corresponding to one of TORs 402A and 402B. Generally, switch 500 may include a switch control module 510, a packet processing and switch fabric module 520, a number of I/O ports 530, layer 2 tables 540, and a networking processor 550. Switch control module may include a layer-2 protocols module 512 which may allow switch control module 510 to use protocols such as the Link Aggregation Control Protocol (LACP), the Intermediate System to Intermediate System (IS-IS) protocol, the TRILL protocol, and others. Switch control module 510 may also build and maintain master switching tables 516 and may include a LAG sub-layer module 514. In its multiple tables, switch 500 may be able to include more than one RBridge identifier as a self-identifier. When switch 500 receives a packet that includes one of its multiple self-identifiers, switch 500 may recognize the packet as intended for it even if the packet does not include switch 500's identifier if it contains an identifier for a logical RBridge associated with switch 500. Thus, switch 500 may act on behalf of the logical RBridge when switch 500 recognizes the identifier of the logical RBridge as an identifier of itself The information stored in master switching tables 516 may be used to maintain layer-2 tables 540, which are lookup tables used by packet processing module 520 to determine how to forward frames of information received by switch 500 on any one of I/O ports 530.

Some of I/O ports 530 may be associated with links that are assigned to an MLAG. I/O ports 530 may include a plurality of such MLAG links, represented in FIG. 5 as a single MLAG link 532. I/O ports 530 may also include a plurality of regular or non-MLAG ports that are not assigned to links that are part of an MLAG. This plurality of links is represented by a single regular link 534. Switch 500 may be configured to use a specific RBridge identifier, such as an identifier of a logical RBridge, in association with a specific port. Switch 500 may also include a logical RBridge assignment routine running in the TRILL protocol functions of the layer-2 protocols module 512. In cooperation with LAG sub-layer module 514, layer-2 protocols module 512 may operate to assign an identifier or nickname of a logical RBridge to one or more table entries that are associated with ports assigned to the MLAG, ports that are depicted as MLAG link 532.

Networking processor 550 may be a computer processor designed or configured to process information in and moving through a network. Networking processor 550 may operate in connection with switch control module 510 and pack processing module 520. In some embodiments, some or all of the functions of switch control module 510, packet processor module 520, and other functions may be provided by networking processor 550.

FIGS. 6A and 6B graphically illustrate two lookup table formats that may be employed to implement various embodiments. FIG. 6A shows a MAC-address-based lookup table that may allow a TOR, such as switch 500, to include the identifier of the appropriate bridging device when receiving packets from servers 104 and forwarding them to one or more bridging devices 106A-N. In FIGS. 6A and 6B, the bridging devices may be RBridges. The MAC-based table of FIG. 6A may include two columns: a MAC address column 604A, and a bridge or RBridge identifier column 606A. The MAC address column 604A may include the source MAC addresses of individual servers of servers 104. RBridge identifier column 606A may include a plurality of RBridge identifiers or nicknames. This plurality may include a subset of logical or pseudo RBridge identifiers (logical RBridge identifier numbers 1, 2, and 3), and another subset of identifiers for physical RBridges (physical RBridge identifier numbers 4, 5, and 6). Having identified the MAC address of a packet from a specific server, the MAC address can be used to determine the RBridge identifier that should be used when encapsulating the packet before sending it through the TRILL network. MLAG ports correspond to logical RBridge identifiers, such as the identifier for logical RBridge 412; and non-MLAG or regular ports correspond to physical RBridge identifiers, such as RBridges 402A and 402B.

FIG. 6B shows a lookup table that is based upon the ingress port identifier of a received packet. The ingress port identifier may be used to determine the ingress RBridge nickname or identifier to append to the packet before it is forwarded through the TRILL network. As depicted, the ingress-port-based table includes two columns an ingress port identifier column 604B, and bridge or RBridge identifier column 606B. Having identified the particular port at which the packet was received, the ingress-port-based table may be used to determine whether the port is assigned to an MLAG port or not by determining which RBridge identifier should be used in a header of the packet when encapsulated. If the ingress port ID is one of numbers 1, 2, and 3, then the appropriate logical RBridge identifier may be selected. This may indicate that the ingress port is an MLAG port. If the ingress port ID is one of numbers 4, 5, and 6, then the appropriate physical RBridge identifier may be selected.

Considering network traffic flow in the opposite direction, when a packet is received at one of TORs 402A or 402B from one of RBridges 106A-N, the RBridge identifier used in the header of the packet may indicate that the packet should be sent to a particular MLAG port or a particular regular port.

Figure 7:
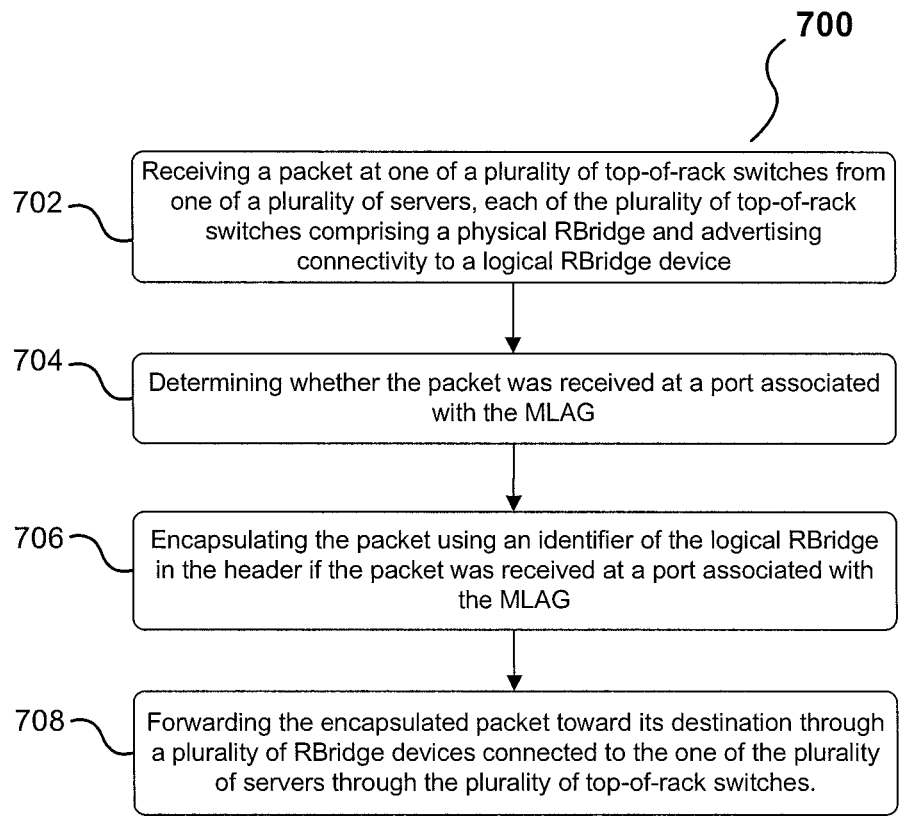
FIG. 7 is a flowchart of a method for implementing a multi-chassis link aggregation group (MLAG) in a network.

FIG. 7 is a flowchart of a method 700 for implementing an MLAG in a TRILL network. Method 700 may begin by receiving a packet at one of a plurality of switches, such as top-of-rack switches, from one of a plurality of servers, in step 702. Each of the plurality of top-of-rack switches may include a physical bridging device and may advertise connectivity to a logical bridging device, such as a logical or pseudo RBridge. In step 704, method 700 may continue by determining whether the packet was received at a port associated with the MLAG. In step 706, the packet may be encapsulated using an identifier of the logical RBridge in the header if the packet was received at a port associated with the MLAG. Method 700 may terminate forwarding the encapsulated packet toward its destination through a plurality of RBridge devices connected to the one of the plurality of servers through the plurality of top-of-rack switches, in step 708.

In operation, method 700 may be performed in the following exemplary manner in a network such as network 400 of FIG. 4 and TORs such as switch 500 of FIG. 5. TOR 402A may receive a packet from one of servers 104 (step 702). TOR 402A may include layer-2 tables 540 that indicate that TOR 402A is connected with logical RBridge 412 and indicate further aspects of the topology of network 400. Switch control module 510 and packet processing module 520 of TOR 402A may be used to determine the MAC address from which the packet was received. Switch control module 510 may determine, by using the MAC address and a lookup table such as lookup table 600A, that the packet was received at a port associated with MLAG 410A (step 704). Alternatively, switch control module 510 and packet processing module 520 of TOR 402A may be used to determine the ingress port at which the packet was received. Switch control module 510 may determine, by using an identifier of the ingress port and a lookup table such as lookup table 600B, that the packet was received at a port associated with MLAG 410A, or whichever MLAG was indicated. If the packet was not received at an ingress port associated with any of MLAGs 410A-N or did not have a MAC address associated with any of MLAGs 410A-N in either table 600A or 600B, switch module 510 may determine that the packet was not received on an MLAG port.

Using either table 600A or table 600B a lookup may determine that the MLAG-associated packet is associated with an identifier of logical RBridge 412A. The identifier may then be included as an ingress RBridge address in a header when the packet is encapsulated (step 706). Then the switch control module 510 and packet processing module 520 may forward the packet to its intended destination through one or more of RBridges 106A-N (step 708).

When an encapsulated packet is received by one of TORs 402A-B from one of RBridges 106A-N, the particular TOR may determine that the egress RBridge address in a header of the packet is for that particular TOR or for one of the logical RBridges 412A-N. If an identifier of logical RBridge 412B, for example, is in the header, the packet may be decapsulated and then sent to one of servers 104 over the appropriate MLAG port as determined by a lookup table. If an identifier of the particular physical TOR is in the header, the packet may be decapsulated and then sent over the appropriate non-MLAG port as determined by a lookup table. The lookup to determine the appropriate port may include performing a lookup in a lookup table similar to 600A in which a destination MAC address may be used to identify a particular MLAG port to use.

Additionally, some embodiments may include a computer-readable medium or media containing non-transitory instructions that, when executed, cause suitable hardware devices to perform the various steps of method 700. In such embodiments, one or more MLAGs may be provided in a network similar to network 300, which may result in a network similar to network 400. Further, a network capable of performing method 700, such as network 400, may be provided using various combinations of hardware devices and tangible, non-transitory computer-readable medium or media containing the appropriate instructions.

Special considerations may arise when considering multicast packets on network 400. If multicast data is received from one of servers 104 by one of TORs 402A-B, it may be handled similarly to unicast data, but TOR 402A or TOR 402B should forward the multicast data on an appropriate distribution tree. If the ingress RBridge of the multicast data is logical RBridge 412A rather than the physical RBridge, flooding of the multicast packet may be restricted to only the non-MLAG ports. Thus, the ports associated with RBridges 412-B-N may have the multicast packet flooded to them. Handling multicast data received from RBridges 106A-N may include allowing one of TORs 402A-B to act as a primary TOR for the pair. In such an embodiment, flooding traffic from the core of network 400 may always access servers 104 through the same TOR. Handling of multicast packets from network 400 may also be performed by ensuring that both TOR 402A and 402B receive the data while ensuring that the multicast data is not forwarded on any of the MLAG ports of either TOR.

The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. A method of implementing a multi-chassis link aggregation group (MLAG) in a network, the method comprising:
receiving a packet at one of a plurality of physical bridging devices from one of a plurality of servers, each of the plurality of physical bridging devices advertising connectivity to a logical bridging device, the logical bridging device comprising the plurality of physical bridging devices and having a logical bridging device identifier that collectively refers to the plurality of physical bridging devices;
determining whether the packet was received at a port associated with the MLAG using a lookup table, the lookup table including the logical bridging device identifier that collectively refers to the plurality of physical bridging devices and a physical bridging device identifier, the logical bridging device identifier being selected if a source media access control (MAC) address indicates that the packet was received at the port associated with the MLAG and the physical bridging device identifier being selected if the source MAC address indicates the packet was received at a port not associated with the MLAG;
encapsulating the packet with a first header including the logical bridging device identifier, which collectively refers to the plurality of physical bridging devices, and forwarding the encapsulated packet toward its destination if the packet was received at the port associated with the MLAG; and encapsulating the packet with a second header including the physical bridging device identifier and forwarding the encapsulated packet toward its destination if the packet was received at the port not associated with the MLAG.

2. The method of claim 1, wherein encapsulating the packet using the first or second header comprises using a Transparent Interconnect of Lots of Links protocol.

3. The method of claim 1, wherein using the lookup table to determine whether the packet was received at the port associated with the MLAG includes looking up a bridging device identifier associated with the source media access control (MAC) address of the packet.

4. The method of claim 1, wherein the plurality of physical bridging devices comprises a first top-of-rack (TOR) switch and a second TOR switch.

5. The method of claim 4, further comprising allowing the first TOR switch to act as a primary TOR switch when the first TOR switch receives multicast data.

6. The method of claim 5, further comprising forwarding, by the primary TOR switch, the multicast data on non-MLAG ports.

7. The method of claim 4, wherein the first TOR switch and the second TOR switch are connected by a stacking link.

8. The method of claim 1, further comprising forwarding packets through a first MLAG when a second MLAG has a failed connection.

9. The method of claim 1, wherein encapsulating the packet using the first or second header comprises using an intermediate system (IS-IS) protocol.

* * * * *